United States Patent [19]

Schirtzinger

[11] Patent Number: 5,060,472
[45] Date of Patent: Oct. 29, 1991

[54] INSULATED COOLING LINER

[75] Inventor: Gary A. Schirtzinger, North Palm Beach, Fla.

[73] Assignee: The United States of America as represented by the Secretary of the Air Force, Washington, D.C.

[21] Appl. No.: 508,334

[22] Filed: Apr. 12, 1990

[51] Int. Cl.⁵ .................. B64D 33/00; F02K 3/10
[52] U.S. Cl. ................................. 60/265; 60/261
[58] Field of Search ............ 60/261, 265, 753; 428/75, 137

[56] References Cited

U.S. PATENT DOCUMENTS

| | | | |
|---|---|---|---|
| 3,349,558 | 10/1967 | Smith | 60/39.65 |
| 3,584,972 | 6/1971 | Bratkovich | 416/229 |
| 4,071,194 | 1/1978 | Eckert et al. | 239/127.3 |
| 4,422,300 | 12/1983 | Dierberger et al. | 60/757 |
| 4,709,643 | 12/1987 | Moreno et al. | 60/753 |
| 4,749,150 | 6/1988 | Rose et al. | 244/53 B |
| 4,773,593 | 9/1988 | Auxier et al. | 239/127.3 |
| 4,817,378 | 4/1989 | Giffin, III et al. | 60/261 |

Primary Examiner—Louis J. Casaregola
Assistant Examiner—Laleh Jalali
Attorney, Agent, or Firm—Jacob N. Erlich; Donald J. Singer

[57] ABSTRACT

This disclosure is for a liner for the exit nozzle of a gas turbine engine. The liner is double walled liner with insulation material between the walls, and with a plurality of tubes extending through the walls and the insulation. Primary cooling is accomplished by film cooling through the tubes. During periods of low coolant medium flow, the liner provides a barrier against radiation and convection. The use of the insulating material allows both walls of the liner to carry the pressure loads.

2 Claims, 1 Drawing Sheet

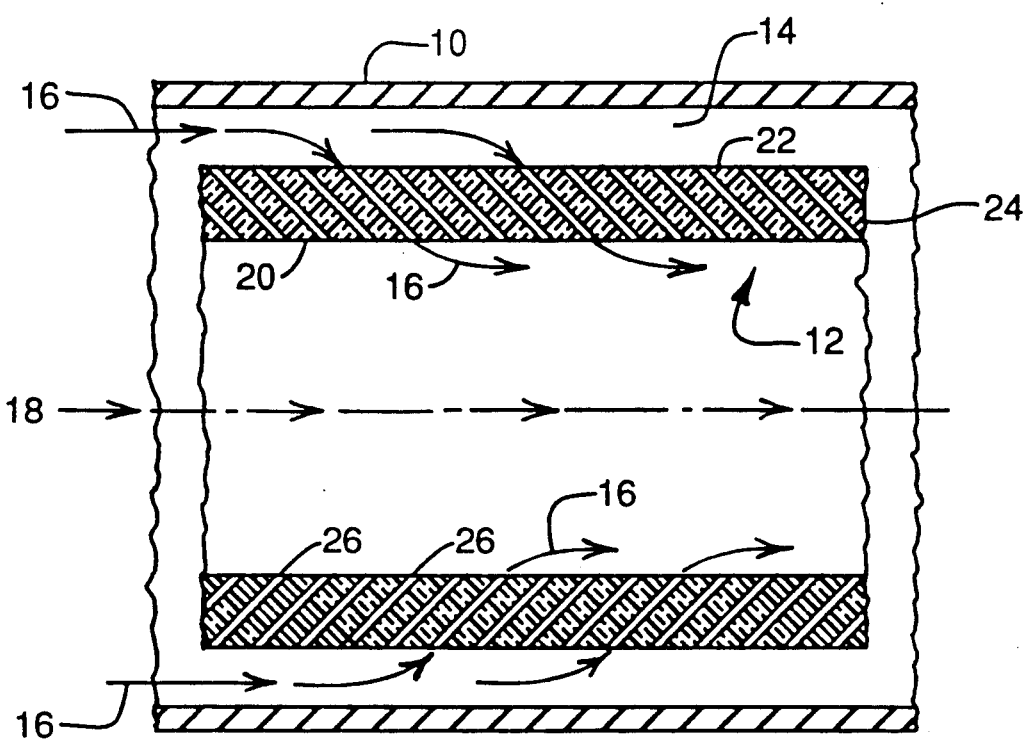

INSULATED COOLING LINER

STATEMENT OF GOVERNMENT INTEREST

The invention described herein may be manufactured and used by or for the Government for governmental purposes without the payment of any royalty thereon.

BACKGROUND OF THE INVENTION

This invention relates to jet engine nozzles, and more particularly to the liners for such nozzles. During certain flight conditions, coolant medium flow is low and this can cause a deleterious heat buildup in the engine nozzle. It is known that the nozzle can be protected by placing a heat shield between the hot gases and the nozzle.

The use of liners to shield a component from damage due to the flow of hot gases through a gas turbine engine is not a new. A search of the prior art revealed a number of U.S. patents disclosing liner systems. For example, Smith U.S. Pat. No. 3,349,558 shows a linear comprising metal constructed of several layers and a plurality of holes for the flow of cooling air. Smith does not use insulation between the layers; nor does he address the problem of pressure loads. Bratkovich Pat. No. 3,584,558 shows a single porous metal sheet liner having both transpiration and film cooling. Eckert et al Pat. No. 4,071,194 shows a liner having impingement cooling and thin film cooling. Dierberger et al Pat. No. 4,422,300 discloses a combustor liner wall comprised of two panels. The first panel has right angled holes, and the second panel has slanting holes. An open plenum is formed between the walls. Rose et al Pat. No. 4,749,150 discloses a porous honeycomb intended for noise suppresson. Auxier et al Pat. No. 4,773,593 disclose a liner having holes for thin film cooling.

SUMMARY OF THE INVENTION

This invention is an improvement over the known liners in that it provides a double walled liner with insulation material between the walls, with a plurality of tubes extending through the walls and the insulation. Primary cooling is accomplished by film cooling. During periods of low coolant medium flow, the liner provides a barrier against radiation and convection. The use of the insulating material allows both walls of the liner to carry the pressure loads, while the tubes through the insulation permit film cooling.

OBJECTS OF THE INVENTION

The principle object of this invention is to provide an insulated liner which provides a barrier against conduction and radiation heat transfer when the primary coolant medium flow is low.

Another object of this invention is to provide a fibrous insulating material between the double walls of a liner, a plurality of tubes extending through the insulation to permit the flow of a coolant to provide film cooling.

Still another object of the invention is to provide an insulated nozzle liner to provide protection to the nozzle against heat due to both radiation and convection.

Another object is to provide a nozzle liner which is film cooled, and which in the absence of cooling medium provides a shield against both radiant and convective heat.

Still another object of this invention is to provide a double walled liner having insulation between the walls and tubes for passing cooling fluids, one of the walls being in the flow path of the hot medium, the other wall being in contact with a cooling medium, and a large plurality of thin wall tubes for the passage of cooling medium, said tubes joining and supporting the two walls.

BRIEF DESCRIPTION OF THE DRAWINGS

For further objects and a clearer understanding of the nature and scope of the invention, reference should now be made to the following detailed specification and to the accompanying drawing in which the single figure shows the cross section of a portion of the nozzle of a gas turbine engine along with the liner which is the subject matter of this invention.

DESCRIPTION OF A PREFERRED EMBODIMENT

Referring to the single figure, there is schematically shown a portion of an exit nozzle 10 of a gas turbine engine. While the invention was conceived for use as a liner for a gas turbine engine nozzle, it will be understood that the liner which is the subject matter of this invention may be used in other applications. For example, the invention may find utility as a liner for the combustion chamber. The nozzle 10 is shown as a cylinder, but it will recognized that it may be shaped as desired for the particular application, and that it may include variable area devices.

A liner 12 is positioned within the nozzle 10 but spaced therefrom in a conventional manner to provide a path 14 for a cooling medium shown by the arrows 16. The cooling medium 16 may, for example, be fan bypass air. The hot gas stream, shown by the arrow 18, passes from the turbine through nozzle chamber 19 of the nozzle 10, the liner 12 surrounding the chamber 19.

The liner 12 is comprised of a first metal sheet 20 (the hot sheet) which is in contact with the hot gas flow from the turbine, not shown, and a second metal sheet 22 (the cold sheet) which is in contact with the cooling medium, the second sheet being spaced from the first sheet. Sandwiched between the two sheets 20 and 22 is a fibrous insulating material 24. A large number of thin walled sheet metal tubes 26 interconnect the sheets 20 and 22 and pass through the insulating material 24.

As seen in the Figure, the tubes 26 are slanted in the direction of the hot gas stream 18. The number of tubes per unit, the diameter of the tube holes, and the degree of slanting would depend on the particular area in the nozzle and the nozzle operating characteristics at that area.

In operation, hot combustion gases 18 exiting from the turbine pass through the chamber 19. The liner 12 surrounding the chamber 19 functions to shield the nozzle 10 from the heat of the combustion gases. The cooling medium 16, which may be bypass air, is supplied under pressure to the space between the liner and the nozzle. Under normal operating conditions, the cooling medium is at a higher pressure than the hot gases and therefore, passes through the holes 26 which are slanted in the direction of hot gas flow, and provides a film of coolant for the exiting gases. However, in the event there is insufficient cooling medium, due to operational conditions of the engine, the nozzle 10 is protected by the insulated liner 12, which shields the nozzle 10 from heat transfer by radiation which is the dominant mode during low cooling medium flow.

IN SUMMARY

The nozzle liner consist of four major parts: A first wall, or hot sheet, in contact with the hot medium, that is, the hot combustion gases from the turbine; a second wall, or cool sheet, in contact with the cooling medium; a large plurality of thin wall tubes joining the two sheets, the cool medium passing therethrough to film cool the hot sheet; an insulation material between the two sheets and filling the space between the tubes.

The liner provides thermal protection for the nozzle in the following manner: the positive pressure difference from the coolant medium to the hot medium (gases or liquids) forces the coolant through the tubes to exit on the hot sheet. The flow of the hot medium past the tube discharge also provides a chimney effect to draw the coolant. The orientation of the tubes which are angled in the direction of flow assists in laying down a coolant film on the hot sheet. This film removes heat from the hot sheet. The insulation blocks convection and radiation heat transfer through the liner, and therefore, it continues to provide protection when coolant flows are reduced and radiation is the dominant energy transfer. The interior of the liner can be sealed against both mediums or open to the cooling medium. When sealed, the pressure difference between the hot and cool mediums is carried across the entire liner. When open, the hot sheet alone carries the pressure load.

It will be apparent to persons skilled in the art that this invention is subject to various modification and adaptations, and that it may be used for application other than nozzles. It is intended therefore, that the invention be limited only by the appended claims, as interpretted in the light of the prior art.

What is claimed is:

1. In a system for heat shielding the exit nozzle of a gas turbine engine from the hot gases flowing therethrough, said system including a stream of cooling fluid, and a liner positioned within said nozzle and spaced therefrom, said hot exit gases from said turbine flowing on one side of said liner, and said cooling fluid flowing on the other side of said liner in the space between said nozzle and said liner, said liner comprising:

a first metal sheet in contact with said stream of hot gases;

a second metal sheet spaced from said first metal sheet, said second sheet being in contact with said stream of cooling fluid;

a plurality of tubes interconnecting said first and second sheets; and a fibrous insulating material sandwiched between said sheets and surrounding said tubes.

2. The invention as defined in claim 1 wherein said tubes are positioned at an angle with respect to the direction of hot fluid flow.

* * * * *